Patented Oct. 10, 1933

1,929,933

UNITED STATES PATENT OFFICE 1,929,933

WAX TREATMENT

Albert G. Peterkin, Jr., Bryn Mawr, Pa., and Lloyd B. Smith, Moorestown, N. J., assignors to The Atlantic Refining Company, Philadelphia, Pa., a corporation of Pennsylvania No Drawing. Application June 13, 1931
Serial No. 544,284

14 Claims. (Cl. 196—20)

The present invention relates to the separation of substances of different fusibility, to the separation of oils from solids, and more particularly, to the separation of mineral oleaginous substances of different fusibility into portions respectively of higher and lower fusibility. While the invention is generally applicable to the separation of mineral oleaginous substances of different fusibility or to the separation of oil films from solid surfaces such as the separation of oil films from granular solids, it is a special object of the invention to effect separation between components of petroleum or of petroleum fractions of different fusibility, particularly oil and/or lower-melting wax from higher-melting wax.

The process is applicable to the separation of wax from oil as by settling or centrifuging, or to the separation of oil from wax in the production of waxes of higher fusibility; in the latter case, the process applies whether the oil is removed by sweating solid crude wax cake, or whether the oil-wax mixture is liquid and the wax then solidified from the oil, either diluted or undiluted, by cooling.

The specific problem on the one hand of getting a lubricating oil of a good cold test, i. e., low pour point, and on the other hand, of preparing a wax of high fusibility, i. e., high melting point, is in both cases one of effecting a separation between wax and oil, or one of separating less fusible oleaginous substances from admixture with oleaginous substances which are more fusible. The problem of separating oleaginous substances of different fusibility is of great importance in the petroleum industry, and accordingly any improvement which will simplify the problem is of utility.

Briefly, the process comprises bringing the liquid-solid mixture to be separated into contact with aqueous solutions of alkaline silicates. Apparently, such solutions lower the surface tension between the liquid to be separated and the solid to which it adheres, or in other words, such solutions interpose themselves between the liquid film and the surface of the solid, without any appreciable dissolving of either, so that the liquid will more easily detach itself from the oleaginous or non-oleaginous solid to which it adheres. For the oleaginous solid, from which an oleaginous liquid is being removed, to remain solid, or if not solid to solidify, the process must, of course, be carried out below the fusion temperature of such solid, i. e., below the fusion temperature of less fusible portions of the oleaginous material.

In our copending application, Serial No. 458,904, filed May 31, 1930, of which the present application is a continuation in part, there is described a process for the sweating of oil from crude wax which comprises contacting the crude wax cake with solutions of alkaline silicates. By suitable modifications of the conditions, such as temperature or concentration of solutions, to suit the individual requirements, this process can be used for separation in general of mineral oleaginous substances, or of mineral oleaginous from non-oleaginous substances, the separation being effected between substances composed of portions of different fusibility, into portions which are more fusible and less fusible respectively than the original substance. Also, as stated above, our process can be used to separate liquid mineral oils from solid substances.

Our invention will hereinafter be described with particularity by referring in detail to a specific aspect thereof in relation to the petroleum industry. Certain fractions are obtained from a number of well known crude petroleums, such as from Mid-Continent and/or Pennsylvania crudes, which contain large percentages of paraffin wax. To separate the wax from such petroleums fractions the usual procedure is to chill, filter, and then subject the wax to the well known sweating process, wherein the crude wax from the filter press, which contains considerable oil, is placed in an oven, the temperature of which is regulated so that oil and/or low melting wax sweat, or exude and separate, from the solidified higher melting wax. As an alternative for the conventional oven sweating, processes of "water sweating" have been suggested, in which solid wax is surrounded by a body of water, the temperature of which is controlled, to cause the wax to sweat.

Solutions of alkaline silicates, employed in accordance with our process, can be applied with special usefulness in the separation of wax from wax-containing oils, particularly in the separation of such waxes as are present in a micro-crystalline or amorphous form. Wax occurs, for example, in such condition in the high viscosity and residuum fractions obtained from pipe still distillation. By admixture of such fractions with sodium silicate solution, for example, the separation of wax from oil, whether it be by settling or centrifuging, will be greatly expedited.

On the other hand, in separating the components of an oil-wax mixture, such as crude scale wax from a filter press, to produce a wax of high fusibility, the separation may be facilitated by bringing the mixture in a heated liquid state into contact with such a solution or liquid as herein suggested, for example, a sodium silicate solution, whereupon the more fusible oleaginous portion on cooling will more easily separate or detach itself from the less fusible portion, and thereby allow the less fusible portion to more readily agglomerate into a solid material of high fusibility. Further, in the sweating of crude wax, such as the oily wax cake collected in the filter press when a wax-containing oil is filtered therein, sodium silicate solutions, for example, when circulated around and in contact with the crude wax, will greatly expedite the sweating operation and production of waxes of high fusibility.

The present invention is not confined to processes for sweating. Solutions, as set forth above, are employed to bring about or expedite the separation of liquid oils from surfaces to which they adhere, particularly, solid oleaginous surfaces. The solutions employed are immiscible with the liquid substances being separated, or such portions of the substance which become liquid as the operation proceeds, and when in contact with such substances have the property of aiding the separation to be effected. We have found that a number of different liquids are suitable for our process. One of the necessary characteristics of the liquid is that it will wash from that portion of the substance being treated which remains solid, the portion of the substances which becomes liquid or appears as liquid on the surface of the solid during treatment. We recognize that water sweating has been suggested. Our invention, however, contemplates surrounding the substance to be separated into solid and liquid components, regardless of whether the separation be by sweating or otherwise, with a liquid which due to its characteristics is more advantageous for such separation than water itself; more rapid sweating results when such liquids are employed than when water is used. Examples of liquids which we have found particularly desirable for such purposes are aqueous solutions of sodium silicate, or of alkaline silicates in general, or of two or more of such materials. By employing these liquid solutions the surface effects are such that a liquid oleaginous substance will detach itself more readily from the surface of that portion of the mixture which is, or is changed to a solid, particularly an oleaginous surface to which the liquid would otherwise adhere. This surface conditioning, or relieving of surface tension, is of special application in the separation of oil from wax, irrespective of whether the mixture be separated by sweating or by running melted crude wax into a liquid such as sodium silicate solution or other alkaline silicate solution, for example, and cooling the liquid until the less fusible portions of the crude wax mixture solidify.

As an example of the advantage gained in the separation of substances as defined herein by proceeding in accordance with our invention, we give as an illustration, results of separating wax from oil employing different liquid solutions to effect a more ready separation thereof.

Upon taking two cakes of slack wax of the same weight and volume, each of which has a melting-point of 102° F., and submerging one cake in water, and the second cake in an 8% aqueous solution of sodium silicate, and maintaining the temperature of the two bodies of liquid at 80° F., after twelve hours, using the volume of the oil which formed as a layer on the surface of the water as unity for purposes of comparison, it was found that the volume of oil which separated over the sodium silicate solution was 3.3. After 43 hours it was found that for 100 parts which separated over the water, 200 parts separated over the silicate solution. From these comparisons it will be observed that material advantage was gained by employing such liquids as herein disclosed for separating mineral oleaginous liquids from solids.

It is to be further understood that our invention contemplates processes, involving surrounding or mixing a substance to be treated with a liquid, substantially immiscible with the portion of the substance which is liquid, or which becomes liquid during treatment, in or by which separation of more fusible from less fusible portions of the substance is effected by raising or lowering the temperature of the immiscible liquid as the case necessitates. Whether the temperature be raised or lowered will, in any case, depend respectively on whether the substance to be separated is initially solid or initially liquid. The invention also contemplates segregating those fractions which separate within desired temperature ranges.

What we claim is:

1. The process for separating a mineral oleaginous substance composed of portions of different fusibility into portions thereof which are respectively more fusible and less fusible, which comprises washing the more fusible portion from the less fusible portion with a solution of at least one of the salts from the group consisting of alkaline silicates, and carrying out such washing at a temperature below the fusion point of the less fusible portion.

2. In a process for washing the more fusible portions from admixture with the less fusible portions of a mineral oil-wax mixture, the steps which comprise bringing a solution of alkaline silicates into contact with the oil-wax mixture, and maintaining the solution at a temperature such as to keep the more fusible portions of the oil-wax mixture liquid.

3. In a process for washing liquid oil from solid mineral wax the step which comprises circulating around and in contact with the solid wax, a solution of sodium silicate at a temperature above that at which the liquid oil will flow.

4. A process for separating mineral wax from oil which comprises agitating the oil-wax mixture in a liquid condition with a solution of at least one of the salts from the group consisting of alkaline silicates, gradually lowering the temperature of said solution whereby the less fusible wax is precipitated in solid form, and separating the solidified wax therefrom.

5. A process for separating mineral wax from oil which comprises agitating the oil-wax mixture in a liquid condition with a solution of sodium silicate, gradually lowering the temperature of said solution whereby the less fusible wax is precipitated in solid form, and separating the solid wax therefrom.

6. A process for separating oil from a mineral oil-wax mixture which comprises agitating the mixture in solid form with a solution of at least one of the salts from the group consisting of alkaline silicates, gradually increasing the temperature of the admixture to cause oil to exude therefrom, and removing the said exuded oil.

7. In a process for separating a mineral oleaginous substance, containing dissimilar components, into at least two portions, the steps which comprise admixing a solution of at least one of the salts from the group consisting of alkaline silicate with the mineral oleaginous substance while the same is in a molten state, thereafter cooling the admixture sufficiently to solidify at least one of the components, and separating the solidified from the liquid components.

8. The process for separating from a mineral oleaginous substance composed of portions of different fusibility, the less fusible portions thereof, which comprises admixing the substance in a molten state with a solution of at least one of the salts from the group consisting of alkaline silicates, gradually lowering the temperature of the admixture so formed to an extent sufficient to cause solidification of less fusible portions, and freeing more fusible portions from solidified less fusible portions.

9. In a process for separating a mineral oleaginous substance composed of portions of different fusibility into more fusible and less fusible portions respectively, the steps which comprise bringing together said substance and a solution of at least one of the salts from the group consisting of alkaline silicates, effecting relative movement of the one with respect to the other, and regulating the temperature so that it will be above the solidification point of the more fusible portions of said substance upon completion of the steps aforesaid.

10. In a process for separating a high melting mineral wax from admixture with a low melting mineral wax, the steps which comprise bringing together such admixture and a solution of at least one of the salts from the group consisting of alkaline silicates, during the time the admixture and solution are in contact with each other, maintaining the admixture at a temperature at which the lower melting mineral wax is fluid, and effecting relative movement of the admixture and solution one with respect to the other, thereby to wash the lower melting from the higher melting components of the admixture.

11. In a process for separating a high melting mineral wax from admixture with a low melting mineral wax, the steps which comprise bringing together such admixture and a solution of sodium silicate, during the time the admixture and solution are in contact with each other, maintaining the admixture at a temperature at which the lower melting mineral wax is fluid, and effecting relative movement of the admixture and solution one with respect to the other, thereby to wash the lower melting from the higher melting components of the admixture.

12. In a process for separating oil from a solid mineral wax with which the oil is intimately admixed, the steps which comprise agitating a solution of sodium silicate with the solid wax, gradually increasing the temperature of the admixture thereby to cause oil to exude from the wax, and passing the exuded oil from contact with the wax.

13. A process for removing a liquid oleaginous film from the surface of a solid mineral oleaginous substance which comprises lowering the attraction between the liquid film and the surface of the solid by agitating the solid with a solution of at least one of the salts from the group consisting of alkaline silicates, and during such agitation, maintaining the solution at a temperature below the fusion point of the oleaginous solid.

14. A process for removing a liqud oleaginous film from the surface of a solid mineral oleaginous substance which comprises lowering the attraction between the liquid film and the surface of the solid by agitating the solid with a solution of sodium silicate, and during such agitation, maintaining the solution at a temperature below the fusion point of the oleaginous solid.

ALBERT G. PETERKIN, JR.
LLOYD B. SMITH.